March 17, 1942.   F. CHRISTEN   2,276,927
FLUID PRESSURE BRAKING SYSTEM AND VALVE MECHANISM RELATING THERETO
Filed Sept. 14, 1940   2 Sheets-Sheet 1
Fig.1
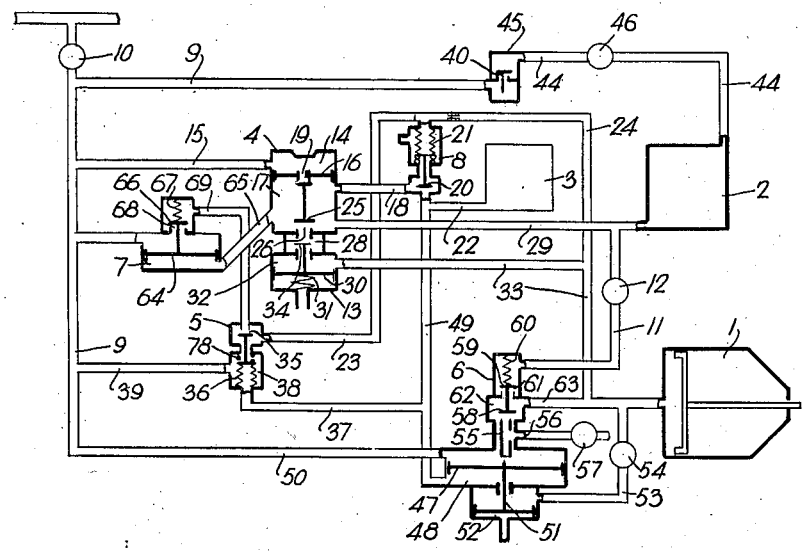
Fig.2
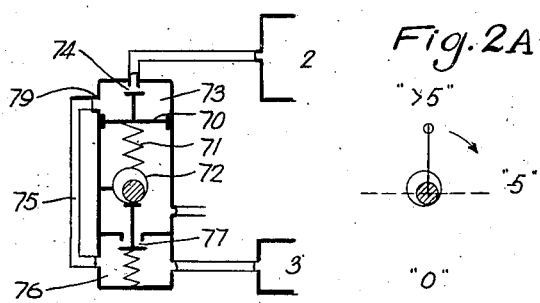
Fig.2A.
INVENTOR
FERNAND CHRISTEN
BY
Blair + Kilcoyne
ATTORNEYS March 17, 1942.  F. CHRISTEN  2,276,927
FLUID PRESSURE BRAKING SYSTEM AND VALVE MECHANISM RELATING THERETO
Filed Sept. 14, 1940  2 Sheets-Sheet 2

INVENTOR
FERNAND CHRISTEN
BY Blair + Kilcoyne
ATTORNEYS

Patented Mar. 17, 1942

2,276,927

UNITED STATES PATENT OFFICE 2,276,927

FLUID PRESSURE BRAKING SYSTEM AND VALVE MECHANISM RELATING THERETO

Fernand Christen, Berne, Switzerland

Application September 14, 1940, Serial No. 356,849
In Switzerland September 30, 1939

13 Claims. (Cl. 303—74)

This invention relates to fluid pressure brake equipment, especially for railway or similar vehicles, in which the supply of fluid under pressure to and the release of fluid under pressure from the brake cylinder or brake cylinders is controlled by varying the pressure in a brake pipe extending throughout the length of the train and controlled by a brake valve device located in the driver's cab.

An object of the invention is to provide a fluid pressure brake equipment of the above type having a main control valve under the control of a substantially constant control pressure with novel local brake pipe venting means to accelerate an application of the brakes locally and to accelerate the propagation of an application of the brakes from car to car throughout the length of a train.

Another object of the invention is to provide a brake equipment of the above type with novel means for preventing the overcharge of the control reservoir and a reservoir from which fluid under pressure is supplied to the brake cylinder, thereby rendering it possible to charge and recharge the equipment at a very rapid rate; and a further feature resides in the provision of novel means for isolating the control reservoir from the supply reservoir and from the brake cylinder and brake pipe when a reduction in brake pipe pressure is initiated to effect an application of the brakes.

Another feature resides in the novel means provided for limiting the amount of fluid locally vented from the brake pipe when an application of the brakes is initiated.

Other objects and advantages will appear in the following more detailed description of the invention.

In the accompanying drawings

Fig. 1 is a diagrammatic view of a brake equipment embodying the invention.

Fig. 2 is a fragmentary diagrammatic view illustrating a device which may be added to the equipment shown in Fig. 1.

Fig. 2A is a fragmentary diagrammatic view illustrating the operating positions of the device shown in Fig. 2.

Figure 3:
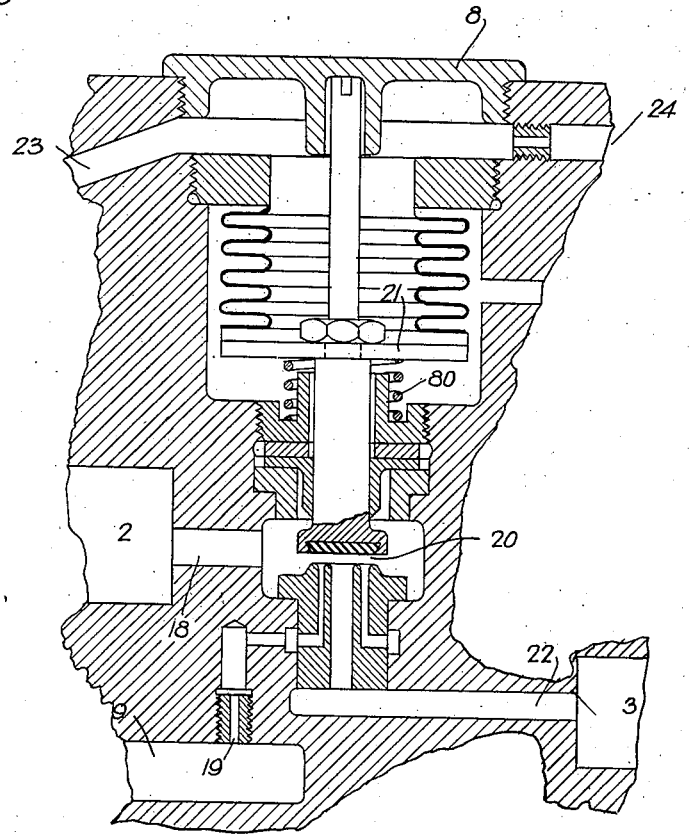
Fig. 3 is a fragmentary diagrammatic sectional view of a modification of a portion of the equipment.

As shown in Fig. 1 of the drawings the brake equipment may comprise a brake cylinder 1, an auxiliary reservoir 2, a control reservoir 3, a brake application accelerator or quick service device 7, a quick service limiting or cut off valve device 5, an inshot device 4, an inshot limiting or cut off valve device 13, a control reservoir cut off or isolating valve device 8, a charging check valve device 45 and a main control device 6, all of which parts and devices are associated with the brake pipe through a pipe 9 and a cut off cock 10.

The brake application accelerator or quick service device 7 may comprise a casing containing a movable abutment 64 and a valve 66. A chamber at the lower side of the abutment is connected by a pipe 65 with a chamber 17 of the inshot device 4. A chamber at the upper side of the abutment 64 is in communication with the pipe 9. The abutment 64 is arranged to operate the valve 66 which is normally closed by a spring 67. Through the several openings of a seat 68 for this valve a connection is made between the pipe 9 and a passage 69, which passage leads to a chamber of the quick service cut off valve device 5 containing a cut off valve 35.

This cut off valve 35 is operated by means of a Sylphon diaphragm 36, the interior of which is in open communication with the control reservoir 3 through passages 37, 49 and 22. The Sylphon diaphragm is contained in a chamber 38 which is connected through a passage 39 with the pipe 9.

The inshot device 4 may comprise a casing in which there is formed a brake pipe chamber 14 which communicates with the pipe 9 through a pipe 15. The bottom of the chamber 14 is formed by a movable abutment 16, having at its underside a control chamber 17 which is connected through pipe 18 and passage 22 with the control reservoir 3. The chambers 14 and 17 are connected through a choked passage 19 in the abutment 16, communication between the chambers being adapted to be closed by the engagement of the abutment with the casing as will hereinafter more fully appear. The connection between the chamber 17 and a chamber 28 is controlled by a valve 25, and this chamber 17 is in communication with the auxiliary reservoir 2 through a pipe 29.

The inshot limiting or cut off valve device 13 which is preferably closely associated with the inshot device 4 comprises a movable abutment 30, subject on its lower face to atmospheric pressure and the pressure of a spring 31. The upper face is subject to the pressure of a chamber 32, which is connected through the pipe 33 with the brake cylinder 1. A valve 34 is operated by the abutment 39 to control a communication between the chamber 28 and the chamber 32.

The control reservoir cut off or isolating valve device 8 is located between the control reservoir 3 and the chamber 17 of the inshot device 4 and comprises a cut off or isolating valve 20 which is operated by a Sylphon diaphragm 21, the interior of which is in open communication with a passage 23 leading from the quick service limiting or cut off valve device 5, and by way of passage 24 and pipe 33 with the brake cylinder 1. The chamber containing the diaphragm is open to the atmosphere.

The charging check valve device 45 comprises a check valve 40 which is arranged to permit the flow of fluid from pipe 9 to the passage 44 and thereby to the auxiliary reservoir and which prevents back flow of fluid from the auxiliary reservoir to the pipe 9.

The main control device 6 may comprise a casing in which a movable abutment 47 is operatively mounted, the lower side of the abutment being exposed to a chamber 48, connected through the passage 49 with the control reservoir 3. A chamber at the upper side of the abutment 47 is in communication with the pipe 9 through a pipe 50. The abutment 47 is operatively connected by means of a stem 51 with a movable abutment 52, the upper side of which abutment 52 is in communication with the brake cylinder 1 through a passage 53 and a control cock 54. The underside of this abutment 52 is subject to atmospheric pressure. The stem 51 is rigidly connected with a tubular brake cylinder release valve member 55, which is movable in the casing of the device. The interior of this valve member is in constant communication with the atmosphere through a passage 56 and a control cock 57. The upper part of the valve member 55 forms the seat for an outlet valve 58 which is rigidly connected with an inlet valve 59. This inlet valve is normally pressed against a fixed valve seat 61 on the casing by means of a spring 60. The valve 59 controls a communication from an auxiliary reservoir pipe 11 to a chamber 62, communicating with a brake cylinder 1 through pipe 63.

It should here be mentioned that for a better understanding of the invention the automatically controlled valves are all shown in open position in Fig. 1, however, during the operation of the apparatus the valves will assume other positions as will be apparent from the following description of the operation of the apparatus.

*Operation—Initial charging of the equipment*

In initially charging the equipment, fluid under pressure which is supplied to the brake pipe in the usual manner, flows through the normally open cock 10 to the pipe 9. From the pipe 9 fluid under pressure flows through pipe 15 to the chamber 14 of the inshot device 4, and if the abutment 16 is in a position for holding the valve 25 unseated, the increase in the pressure of fluid being supplied to the chamber at a considerably faster rate than fluid can flow from through the choked bore 19 in the abutment 16, will cause the abutment to move downwardly and seat the valve.

Fluid under pressure flows through the bore 19 to the control chamber 17, and from thence may flow through the passage 18, past the open control reservoir cut off or isolating valve 20, pipes 49 and 22 to the control reservoir, the valve 20 being held open by means of a spring 80. From the chamber 17 fluid under pressure may flow through pipe 29 to the auxiliary reservoir 2. The main supply of fluid from the pipe 9 to the control and auxiliary reservoir is by way of check valve 40 and pipe 44, this latter supply being at a rapid rate so as to quickly charge the reservoirs and associated control chambers.

Fluid under pressure also flows from the control chamber 17 to the chamber below the abutment 64 of the brake application accelerator or quick service valve device 7. The chamber above this abutment is supplied with fluid under pressure from the pipe 9, and since the pressure in these abutment chambers will be substantially equal, the force of the spring 67 maintains the valve 66 seated, thus preventing the flow of fluid from the brake pipe to the quick service passage 69.

Fluid under pressure supplied to passage 49 flows therefrom to the chamber 48 at the underside of the abutment 47 of the main control device 6. The chamber at the other side of the abutment is supplied with fluid under pressure from the pipe 9 by way of pipe 50. The flow of fluid through this latter chamber will be more direct than the flow to the chamber 48 and therefore the increase in the pressure in said latter chamber will be more rapid than in chamber 48, so that if the abutment 47 is not already in its release position as shown, the pressure of fluid in the latter chamber will cause it to move to this position and therby shift the valve member 55 to its release position. With the valve member in this position, the spring 60 maintains the brake cylinder supply or inlet valve 59 seated on its seat 61, and when so seated, the valve 58 will be out of engagement with the valve 55.

With the valves 55 and 58 in their release positions as just described, the brake cylinder is open to the atmosphere by way of pipe 63, the open valve 58, the interior of valve member 55, pipe 56 and cock 57. Since the pipe 53 is connected to the brake cylinder pipe 63, the chamber 32 of the inshot device 4 will be at atmospheric pressure, so that the force of spring 31 will maintain the abutment 39 in its upper position and thereby the valve 28 open as shown.

The chamber at the upper side of the abutment 52 is connected to the brake cylinder pipe 63 by way of pipe 53 and cock 54 and is therefore at atmospheric pressure. The chamber at the lower side of this abutment is connected with the atmosphere. Since both of these chambers are at atmospheric pressure, the abutment 52 will not have any effect upon the operation of control device during the initial charging of the equipment.

Fluid under pressure also flows from the passage 49 through passage 37 to the interior of the Sylphon diaphragm 36 of the quick service limiting or cut off valve device 5, the exterior of the diaphragm being subjected to fluid at brake pipe pressure supplied by way of pipes 9 and 50 to the diaphragm chamber 38. Since the pressures acting interiorly and exteriorly of the diaphragm are substantially equal, the spring 73 will maintain the valve 35 open as shown.

It should here be mentioned that since in initially charging the equipment the auxiliary and control reservoirs 2 and 3, respectively are maintained connected together, the pressures in one cannot exceed that in the other. However, if the operator is not careful in the operation of his manual control valve device, such as the usual brake valve device, both of the reservoirs may be charged to a pressure higher than that normally carried. When this occurs the overcharge may be dispelled by venting fluid under pressure from the brake pipe and thereby from pipe 9 at a slower rate than fluid under pressure can flow from the reservoir through the choked bore 19 in the abutment 16 of the inshot device 4, thus the pressure of the reservoirs is reduced to the pressure desired without effecting the operation of any of the several control devices of the equipment.

*Service application of the brakes*

In order to effect a service application of the brakes, the brake pipe pressure is reduced at a service rate in the usual manner, i. e., at a rate exceeding the rate of flow of fluid through the choked bore 19, and since the chamber at the upper side of the abutment 64 of the brake application accelerator or quick service device 7 is open to the pipe 9 and consequently to the brake pipe, a corresponding reduction in the pressure of fluid in this chamber is effected. In response to this reduction in the chamber pressure, fluid at the higher auxiliary reservoir pressure in the chamber at the under side of the abutment causes the abutment to move upwardly and thereby open the valve 69 against the opposing force of spring 67. With the valve 66 open, fluid under pressure flows from the chamber at the upper side of the abutment 64 and thereby from the pipe 9 and connected brake pipe to the interior of the Sylphon diaphragm 21 by way of passage 69, past the open valve 35 of the quick service limiting or cut off device 5 and passage 23, and then by way of choked passage 24 and pipes 33 and 63 to the brake cylinder. This venting of fluid under pressure from the pipe 9 and the brake pipe will, in a train, accelerate the brake application operation of the several devices of the local brake equipment and will accelerate the operation of the quick service venting on the next car of the train. This action will be repeated serially from car to car throughout the length of the train, thus insuring a very rapid propagation of the brake application from one end of the train to the other.

The pressure of fluid supplied to the interior of the Sylphon diaphragm 21 in the manner just described causes the diaphragm to act to seat the control reservoir cut off or isolating valve 20 against the opposing force of the spring 80, thus completely isolating the control reservoir 3 from the auxiliary reservoir 2, brake cylinder 1 and brake pipe. There is no way now for fluid under pressure to escape from the control reservoir and the chambers which are in open communication therewith, therefore the pressure of fluid in the control reservoir and these chambers will remain substantially constant.

The chamber at the upper side of the abutment 47 of the main control device 6 is in open communication with the brake pipe by way of pipes 50 and 9, so that the reduction in brake pipe pressure will effect a corresponding reduction in the pressure of fluid in the chamber. Upon this reduction in the chamber pressure, the abutment 47, in response to the higher control reservoir pressure in the chamber at the underside of the abutment, moves upwardly, carrying the abutment 52 with it and moving the valve member 55 upwardly to first close the exhaust communication from the brake cylinder pipe 63 to the exhaust pipe 56 and to then unseat the inlet or supply valve 59 against the opposing force of the spring 60. With the valve 59 unseated, fluid under pressure flows from the auxiliary reservoir 2 through pipe 11, cock 12, past the open valve 59 through pipe 63 to the brake cylinder 1, the rate of such flow being controlled by the flow area of the passage through the cock.

The chamber 14 of the inshot device 4 is connected to the pipe 9 and thereby to the brake pipe, so that the reduction in brake pipe pressure at a service rate, i. e., in excess of the possible rate of flow of fluid through the choked bore 19 in the abutment 16 will effect a reduction in the pressure of fluid in this chamber. Upon this reduction in chamber pressure, the abutment 16, in response to the higher auxiliary reservoir pressure in chamber 17, moves upwardly, first unseating the inshot valve 25 and then moving into engagement with the casing to close the choked bore 19. With the valve 25 open, fluid under pressure flows at a rapid rate from the auxiliary reservoir to the brake cylinder by way of pipe 29, chamber 17, past the open valve 25 and 28, chamber 32, passage 33 and pipe 63. It should here be mentioned that the brake cylinder is now being supplied with fluid under pressure from the auxiliary reservoir by way of the inshot device 4 and also by way of the cock 12, so that the increase in brake cylinder pressure will be very rapid. Now when the brake cylinder pressure has been increased to a predetermined degree, the abutment 30 will move downwardly against the opposing force of the spring 31 and seat the inshot limiting valve 28, thus cutting off the rapid inshot flow of fluid to the brake cylinder. The brake cylinder pressure will however continue to flow from the auxiliary reservoir to the brake cylinder at a slow rate by way of the cock 12.

When the brake pipe pressure chamber 38 of the quick service cut off device 5 has been reduced a predetermined amount, the fluid at control reservoir pressure in the interior of the Sylphon diaphragm 36 causes the diaphragm to expand vertically and thereby seat the valve 25 and thus cut off any further quick service flow of fluid from the brake pipe to the brake cylinder.

Fluid under pressure supplied to the brake cylinder pipe 63 flows through passage 53 and cock 54 to the chamber at the upper side of the abutment 52 of the main control device 6, and when the combined pressures of the brake pipe fluid acting on the upper face of the abutment 47, the fluid acting on the upper face of the abutment 50 and the pressure of the spring 60 slightly exceeds the control reservoir pressure, acting on the underside of the abutment 47, the abutments in response to the higher pressure move downwardly and, through the medium of the piston stem 51, shift the valve member 55 downwardly. By reason of this downward movement of the valve, the spring 60 is permitted to seat the valve 51, thereby cutting off the flow of fluid from the auxiliary reservoir 2 to the brake cylinder 1. As soon as the valve seats, the build up of brake cylinder pressure will cease, consequently the abutments will come to a stop. It will here be understood that when the abutments come to a stop the outlet valve 58 will remain in engagement with the valve 55 and thereby maintain the brake cylinder exhaust communication closed.

The inlet and outlet valves 59 and 58, respectively, being in their closed positions, the brake cylinder pressure will be limited to that called for by the reduction in brake pipe pressure, a further increase in brake cylinder pressure requiring another reduction in the already reduced brake pipe pressure. If, however, the pressure in the brake cylinder is accidentally reduced, as by leakage, the pressure of fluid in the chamber above the abutment will be correspondingly reduced. This reduction in chamber pressure unbalances the pressure acting on the abutment assembly and thereby permits the fluid at control reservoir pressure in chamber 48 to move the abutment assembly and valve member 55 upwardly so as to unseat the inlet valve 59. With valve 59 unseated, fluid under pressure flows from the auxiliary reservoir to the brake cylinder until the brake cylinder pressure is restored to that called for by the reduced brake pipe pressure, at which time, the increase in brake cylinder pressure causes the abutment assembly to again operate to cut off the supply of fluid under pressure to the brake cylinder, thus brake cylinder pressure once established is automatically maintained against leakage.

If it is desired to increase the brake cylinder pressure, the reduced brake pipe pressure is further reduced in the usual manner. In response to such a reduction the main control valve device functions in the same manner as upon the initial reduction to supply fluid under pressure from the auxiliary reservoir 2 to the brake cylinder and to cut off the supply when the brake cylinder pressure, called for by the further reduction, is attained. The brake cylinder pressure can thus be increased step by step until the auxiliary reservoir pressure equalizes into the brake cylinder, or until a predetermined maximum brake cylinder pressure is obtained in an equipment embodying a brake cylinder pressure limiting device.

Release of the brakes

In order to effect a graduated release of the brakes, the brake pipe pressure is increased step by step. Each increase in brake pipe pressure results in an increase in the pressure of fluid in the chamber at the upper side of the abutment 47 of the main control device 6, causing the abutment assembly to move the valve member 55 out of engagement with the valve 58. Fluid under pressure now flows from the brake cylinder to the atmosphere by way of pipe 63, the open valve 58, the interior of valve member 55, pipe 56 and cock 57.

Now when the combined reducing brake cylinder pressure in the chamber at the upper side of the abutment 52 and the increased brake pipe pressure in the chamber at the upper side of the abutment 47 becomes slightly lower than the control reservoir pressure in the chamber at the under side of the abutment 47, the abutment assembly moves upwardly seating the valve member 55 against the valve 58, thus cutting off the flow of fluid from the brake cylinder. This of course terminates the reduction of pressure of fluid in the chamber at the upper side of the abutment 52 and as a consequence the abutment assembly comes to a stop without unseating the inlet valve 58.

This releasing operation is repeated at each further increase in brake pipe pressure until the brake cylinder pressure is reduced to atmospheric pressure, so that the brakes are completely released.

It will be understood that if a straight away release of the brakes is desired the recharging of the brake pipe will be continuous until the pressure normally carried is attained.

During the increase in brake pipe pressure, fluid at brake pipe pressure in chamber 14 of the inshot device 4 will be equal to or greater than auxiliary reservoir pressure, and as a consequence, the abutment 64 will move downwardly and open the choked bore 19 and seat the valve 28. From the brake pipe fluid under pressure flows to the auxiliary reservoir 2 by way of the bore 19 and also by way of pipe 9, check valve 40 and pipe 44. Further, the increase in brake pipe pressure in the chamber above the abutments 64 of the brake accelerator device 7 will permit the spring 67 to seat the quick service valve 66.

When the brake pipe pressure has been increased to nearly the normal pressure carried, this pressure acting on the exterior of the Sylphon diaphragm 36 of the quick service cut off valve device 5 permits the spring 78 to contract the diaphragm and unseat the cut off valve 35.

When the brake cylinder pressure present in the interior of the Sylphon diaphragm 21 of the control reservoir cut off device 8 has been reduced to a very low degree, the spring 80 acts to unseat the valve 20. Also when the brake cylinder pressure in the chamber at the upper side of the abutment 30 reduces to a very low degree the spring 31 acts to move the abutment 30 upwardly thus seating the inshot valve 34.

With the valve 20 unseated, the control reservoir and auxiliary reservoir pressures will equalize and both reservoirs will then be fully charged by way of the bore 19 and check valve 40.

The cocks 46, 12, 57 and 54 hereinbefore mentioned, are all for the purpose of varying the rate of flow of fluid under pressure to or from various parts of the equipment, and are each provided with a plurality of ports of different flow areas which may be selectively brought into registration with the fluid conduit in which the cock is interposed. The cock 46 may be operated to vary the rate of flow of fluid from the brake pipe to the auxiliary reservoir 2, the cock 12 to vary the rate of flow of fluid from the auxiliary reservoir to the brake cylinder, the cock 57 to vary the rate of flow of fluid from the brake cylinder to the atmosphere, and the cock 54 to vary the rate of flow of fluid between the brake cylinder and the chamber at the upper side of the abutment 52 of the main control device 6. All of these cocks will be properly positioned preparatory to starting on a run to produce the control desired.

By the use of the cocks 46, 12 and 57, the equipment may be conditioned for any one of a plurality of classes of train service, such for instance as freight, passenger and express train service. If desired a single cock may be provided having ports therein corresponding to the ports of these cocks.

By the use of the cock 54 the brake cylinder pressure obtained for a given reduction in brake pipe pressure may be varied, since this cock controls the rate of build up of control pressure in the chamber at the upper side of the abutment 52.

Description of apparatus shown in Figs. 2 and 2A

The apparatus shown in Figs. 2 and 2A is adapted to be added to the equipment shown in Fig. 1 for the purpose of automatically reducing any overcharge of the control reservoir 3 each time an application of the brakes is initiated, and for the further purpose of bleeding the auxiliary and control reservoirs to atmospheric pressure when this is desired.

The apparatus may comprise a casing in which there is operatively mounted a movable abutment 70 which at one side is subject to the pressure of the spring 71 with which a rotatable cam 72 cooperates to vary the force of the spring on the abutment. This cam is rotatable by means of the manually operable shaft which is shown in cross-section and which may be suitably journaled in the casing. In Fig. 2A an arm is diagrammatically shown for rotating the cam actuating shaft, which arm may be moved selectively to any one of three positions indicated by the reference characters ">5", "5" and "0". With the arm in the position ">5" as shown in Fig. 2A this spring will be in condition to exert the maximum pressure on the abutment, with the arm in the position "5" the spring will be conditioned to exert a lesser pressure of the abutment and with the arm in the position "0" the spring will exert no pressure on the abutment.

At the other side of the abutment 70 there is a chamber 73 containing a valve 74 which is operative by the abutment to control communication between this chamber and the auxiliary reservoir 2.

Contained in a chamber 76 provided in the casing is a valve 77 which is operative to control communication between the chamber and the atmosphere. This valve is normally maintained seated by springs contained in chamber 76 and is operative to its open position by the cam 72 only when the cam actuating arm is moved to the position "0". The chamber 76 is in constant open communication with the control reservoir 3 and with the passage 75 leading to the chamber 73.

In operation, should the auxiliary and control reservoirs, in initially charging the equipment, or in recharging the equipment to effect the release of the brakes, become overcharged to such an extent that the control reservoir pressure present in chamber 73 maintains the abutment in the position in which the valve 74 is in its open position, fluid under pressure will flow past this open valve from the control reservoir 3 to the auxiliary reservoir 2 and thus decrease the control reservoir pressure. When the control reservoir pressure in chamber 73 is thus reduced to slightly less than the adjusted opposing pressure of the spring 71, this spring acts to seat the valve 74 thereby cutting off the further flow of fluid from the control reservoir. From this it will be understood that each time an application of the brakes is initiated, any overcharge of the control reservoir will be automatically dispelled. By reason of this, the control reservoir will be reduced to the pressure called for by the pressure of the spring 71.

When it is desired to completely or partially release the fluid under pressure from the auxiliary and control reservoirs, the arm of the apparatus is moved to the position "0," in which position the cam maintains the valve 77 unseated and permits the valve 74 to open. With these valves open fluid under pressure flows from both reservoirs to the atmosphere by way of the open valve 77 and the atmospheric passage located between chambers 76 and cam 72, the flow of fluid from the auxiliary reservoir being by way of the open valve 74, chamber 73, passage 75 and chamber 76. It will here be noted that with the handle in either the position ">5" or position "5," the valve 77 will be maintained seated by its spring.

*Description of the device shown in Fig. 3*

The control reservoir cut off or isolating valve device shown in Fig. 3 may be substituted for the corresponding device 8 shown in Fig. 1. This present device differs from the device shown in Fig. 1 in having a direct choke communication from the pipe 9 and thereby from the brake pipe to the seat for the cut off valve 20. By the use of this communication the passage 19 through the piston 16 is eliminated.

In operation, when an application of the brakes is initiated, the pressure of fluid locally vented from the brake pipe by way of passage 23 will cause the valve 20 to seat in the same manner as described in connection with the apparatus shown in Fig. 1. In the present instance the valve cuts off communication between the auxiliary reservoir 2 and the brake pipe.

In this figure there is shown interposed in the quick service passage 24 a choke plug which will serve to insure a rapid increase in the pressure of fluid in the Sylphon diaphragm 21 and thus insure the prompt operation of the valve 20 to isolate the control reservoir.

Figure 4:
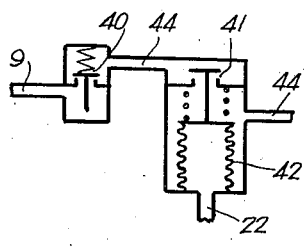
Fig. 4 is a fragmentary diagrammatic view of a control device which may be added to the equipment shown in Fig. 1.
Figure 5:
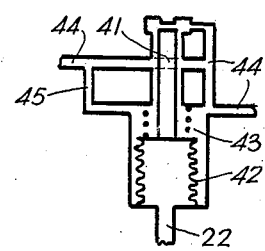
Fig. 5 is a fragmentary diagrammatic view of a control device which may be substituted for the control device shown in Fig. 4.

*Description of the device shown in Figs. 4 and 5*

The device shown in Fig. 4 may be added to the equipment shown in Fig. 1 for the purpose of cutting off the charging flow of fluid to the auxiliary reservoir in releasing the brakes when the auxiliary reservoir pressure has been increased substantially that of the charged control reservoir, the control reservoir pressure, as described in connection with Fig. 1, being held substantially constant until the brakes are substantially fully released.

This device may be interposed from the passage 44 at a point located between the check valve device 49 and the cock 46 of Fig. 1, and may comprise a casing having an inlet chamber, an outlet chamber and a passage connecting the chambers, which connecting passage is controlled by a valve 41 contained in the outlet chamber. This valve is operated by a Sylphon diaphragm 42 contained in the outlet chamber, the interior of the diaphragm being in constant open communication of the control reservoir 22. Interposed between and operatively engaging the upper end of the diaphragm and a wall of the casing is a spring 43 which, at all times, tends to contract the diaphragm.

In operation, when an application of the brakes is initiated, the auxiliary reservoir pressure is of course reduced by the flow of fluid from the reservoir to the brake cylinder, so that fluid at control reservoir pressure within the diaphragm 42 will maintain the diaphragm expanded and thereby the valve 41 unseated. Now when the brakes are being released fluid under pressure from the brake pipe flows past the open valve 41 to the auxiliary reservoir. This flow will be very rapid and when the auxiliary reservoir pressure in the outlet chamber device becomes substantially equal to the control reservoir pressure in the diaphragm the spring 43 acts to compress the diaphragm, thereby seating the valve 41. With the valve 41 seated there can be no further flow through the passage 44 to the auxiliary reservoir, thus the danger of overcharging the auxiliary reservoir while the control reservoir is isolated therefrom is prevented.

In Fig. 5 a modification of the device is illustrated in which the Sylphon diaphragm operates a plunger having an opening therethrough which is adapted to register with the passage 44 to permit the charging flow of fluid from the brake pipe to the auxiliary reservoir. When the auxiliary reservoir pressure has been increased to substantially that of the control reservoir pressure in the diaphragm, the spring 43 acts to compress the diaphragm and thereby draw the plunger downwardly, thus moving the plunger opening out of connecting communication with the passage 44, the upper end of the plunger sealing off both ends of the passage 44 within the casing of the device.

For the purpose of continuing the charge of the auxiliary reservoir at a slow rate after the communication through the opening in the plunger is cut off, a choked passage is provided which extends from the passage 44 at one side of the device to the passage 44 at the other side of the device.

While several illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a fluid pressure brake equipment, in combination, a normally charged brake pipe, a normally charged auxiliary reservoir, a normally charged control reservoir, said reservoirs being normally connected together, a brake controlling valve device normally subject to the opposing pressures of the brake pipe and control reservoir and operative upon a reduction in brake pipe pressure to supply fluid under pressure from the auxiliary reservoir to effect an application of the brakes, means operative upon a reduction in brake pipe pressure for locally venting fluid under pressure from the brake pipe to effect a quick service reduction in brake pipe pressure, and means responsive to the pressure of fluid locally vented from the brake pipe for closing the connection between said reservoirs.

2. In a fluid pressure brake equipment, in combination, a normally charged brake pipe, a normally charged auxiliary reservoir, a normally charged control reservoir, said reservoirs being normally connected together, a brake controlling valve device normally subject to the opposing pressures of the brake pipe and control reservoir and operative upon a reduction in brake pipe pressure to supply fluid under pressure from the auxiliary reservoir to effect an application of the brakes, means operative upon a reduction in brake pipe pressure for locally venting fluid under pressure from the brake pipe to effect a quick service reduction in brake pipe pressure, means responsive to the pressure of fluid locally vented from the brake pipe for closing the connection between said reservoirs, and means subject to the opposing pressures of the brake pipe and control reservoir operative upon a predetermined reduction in brake pipe pressure for limiting the amount of fluid locally vented from the brake pipe.

3. In a fluid pressure brake equipment, in combination, a normally charged brake pipe, a normally charged auxiliary reservoir, a normally charged control reservoir, said reservoirs being normally connected together, a brake controlling valve device normally subject to the opposing pressures of the brake pipe and control reservoir and operative upon a reduction in brake pipe pressure to supply fluid under pressure from the auxiliary reservoir to effect an application of the brakes, means operative upon a reduction in brake pipe pressure for locally venting fluid under pressure from the brake pipe to effect a quick service reduction in brake pipe pressure, means responsive to the pressure of fluid locally vented from the brake pipe for closing the connection between said reservoirs, and means subject to the opposing pressures of the control reservoir and brake pipe and operative upon a predetermined reduction in brake pipe pressure for limiting the amount of fluid locally vented from the brake pipe.

4. In a fluid pressure brake equipment, in combination, a normally charged brake pipe, a normally charged auxiliary reservoir, a normally charged control reservoir, a brake cylinder, means subject to the opposing pressures of the brake pipe and control reservoir and operative by control reservoir pressure upon a reduction in brake pipe pressure to supply fluid under pressure from the auxiliary reservoir to the brake cylinder, means subject to the opposing pressures of the brake pipe and auxiliary reservoir and operative upon the reduction in brake pipe pressure for supplying fluid under pressure from the auxiliary reservoir to the brake cylinder, and means responsive to a predetermined increase in brake cylinder pressure for cutting off the last mentioned supply of fluid under pressure to the brake cylinder.

5. In a fluid pressure brake equipment, in combination, a normally charged brake pipe, a normally charged auxiliary reservoir, a normally charged control reservoir, said reservoirs being normally connected together; a brake controlling valve device normally subject to the opposing pressures of the brake pipe and control reservoir and operative upon a reduction in brake pipe pressure to supply fluid under pressure from the auxiliary reservoir to effect an application of the brakes, said control valve device being operative upon a subsequent increase in brake pipe pressure to release fluid under pressure to effect a release of the brakes; valve means operative to control the connection between said reservoirs so as to isolate the control reservoir from the auxiliary reservoir when an application of the brakes is being effected and to again connect the reservoirs together when the brakes are being released; said valve means comprising a valve and fluid pressure responsive means for controlling the operation of the valve and means operative upon the reduction in brake pipe pressure for venting fluid under pressure from the brake pipe to effect a quick service reduction in brake pipe pressure and to effect the operation of said fluid pressure responsive means and thereby said valve to isolate the control reservoir from the auxiliary reservoir, said fluid pressure responsive means and thereby said valve being operative, upon the release of fluid under pressure in effecting the release of the brakes, to connect the reservoirs.

6. The combination of claim 5 further characterized in that the reservoir connection controlling valve means is operative to connect the reservoirs only when the brakes are substantially fully released.

7. In a fluid pressure brake equipment, in combination, a normally charged brake pipe, a normally charged auxiliary reservoir, a normally charged control reservoir, said reservoirs being normally connected together, a brake controlling valve device normally subject to the opposing pressures of the brake pipe and control reservoir and operative upon a reduction in brake pipe pressure to supply fluid under pressure from the auxiliary reservoir to effect an application of the brakes, said control valve device being operative upon a subsequent increase in brake pipe pressure to release fluid under pressure to effect the release of the brakes, valve means operative to control the connection between said reservoir so as to isolate the control reservoir from the auxiliary reservoir when an application of the brakes is being effected and to again connect the reservoirs together when the brakes are being released, a charging communication through which fluid under pressure may flow from the brake pipe to the auxiliary reservoir when the control reservoir is isolated from the auxiliary reservoir, and means subject to control reservoir pressure for limiting the degree to which the auxiliary reservoir may be recharged with fluid under pressure from said charging communication while the control reservoir is isolated from the auxiliary reservoir.

8. In a fluid pressure brake equipment, in combination, a normally charged brake pipe, a normally charged auxiliary reservoir, a normally charged control reservoir, said reservoirs being normally connected together, a brake controlling valve device normally subject to the opposing pressures of the brake pipe and control reservoir and operative upon a reduction in brake pipe pressure to supply fluid under pressure from the auxiliary reservoir to effect an application of the brakes, said control valve device being operative upon a subsequent increase in brake pipe pressure to release fluid under pressure to effect the release of the brakes, valve means operative to control the connection between said reservoirs so as to isolate the control reservoir from the auxiliary reservoir when an application of the brakes is being effected and to again connect the reservoirs together when the brakes are being released, a charging communication through which fluid under pressure may flow from the brake pipe to the auxiliary reservoir when the control reservoir is isolated from the auxiliary reservoir, and means subject to control reservoir pressure and operative upon a predetermined increase in auxiliary reservoir pressure for closing said charging communication.

9. In a fluid pressure brake equipment, in combination, a normally charged brake pipe, a normally charged auxiliary reservoir, a normally charged control reservoir, said reservoirs being normally connected together, a brake controlling valve device normally subject to the opposing pressures of the brake pipe and control reservoir and operative upon a reduction in brake pipe pressure to supply fluid under pressure from the auxiliary reservoir to effect an application of the brakes, said control valve device being operative upon a subsequent increase in brake pipe pressure to release fluid under pressure to effect the release of the brakes, valve means operative to control the connection between said reservoirs so as to isolate the control reservoir from the auxiliary reservoir when an application of the brakes is being effected and to again connect the reservoirs together when the brakes are being released; a charging communication through which fluid under pressure may flow from the brake pipe to the auxiliary reservoir when the control reservoir is isolated from the auxiliary reservoir, and means subject to the opposing pressures of the control reservoir and auxiliary reservoir and operative upon a predetermined increase in auxiliary reservoir pressure for closing said charging communication.

10. In a fluid pressure brake equipment, in combination, a normally charged brake pipe, a normally charged auxiliary reservoir, a normally charged control reservoir, said reservoirs being normally connected together, a brake controlling valve device normally subject to the opposing pressures of the brake pipe and control reservoir and operative upon a reduction in brake pipe pressure to supply fluid under pressure from the auxiliary reservoir to effect an application of the brakes, said control valve device being operative upon a subsequent increase in brake pipe pressure to release fluid under pressure to effect the release of the brakes, valve means operative to control the connection between said reservoirs so as to isolate the control reservoir from the auxiliary reservoir when an application of the brakes is being effected and to again connect the reservoirs together when the brakes are being released, a charging communication through which fluid under pressure may flow from the brake pipe to the auxiliary reservoir when the control reservoir is isolated from the auxiliary reservoir, and means operative when the auxiliary reservoir pressure has been increased, by the flow of fluid to said communication, to substantially that of the control reservoir for closing the communication.

11. In a fluid pressure brake equipment, in combination, a normally charged brake pipe, a normally charged auxiliary reservoir, a normally charged control reservoir, said reservoirs being normally connected together, a brake controlling valve device normally subject to the opposing pressures of the brake pipe and control reservoir and operative upon a reduction in brake pipe pressure to supply fluid under pressure from the auxiliary reservoir to effect an application of the brakes, said control valve device being operative upon a subsequent increase in brake pipe pressure to release fluid under pressure to effect the release of the brakes, valve means operative to control the connection between said reservoirs so as to isolate the control reservoir from the auxiliary reservoir when an application of the brakes is being effected and to again connect the reservoirs together when the brakes are being released, a communication between the control and auxiliary reservoirs through which fluid under pressure may flow from the control reservoir to the auxiliary reservoir, and means operative when the pressure in said reservoirs is higher than normal for maintaining said communication open, and operative when the control reservoir pressure reduces with the auxiliary reservoir to a predetermined value, in effecting an application of the brakes, for closing said communication.

12. In a fluid pressure brake equipment, in combination, a normally charged brake pipe, a normally charged auxiliary reservoir, a normally charged control reservoir, said reservoirs being normally connected together, a brake controlling valve device normally subject to the opposing pressures of the brake pipe and control reservoir and operative upon a reduction in brake pipe pressure to supply fluid under pressure from the auxiliary reservoir to effect an application of the brakes, said control valve device being operative upon a subsequent increase in brake pipe pressure to release fluid under pressure to effect the release of the brakes; valve means operative to control the connection between said reservoirs so as to isolate the control reservoir from the auxiliary reservoir when an application of the brakes is being effected and to again connect the reservoirs together when the brakes are being released, a communication between the control and auxiliary reservoirs through which fluid under pressure may flow from the control reservoir to the auxiliary reservoir, and means operative when the pressure in said reservoir is higher than normal for maintaining said communication open, and operative when the control reservoir pressure reduces with the auxiliary reservoir pressure to a predetermined value in effecting an application of the brakes to close said communication, and means operative to condition the last mentioned means for operation to close said communication in response to a reduction in auxiliary reservoir pressure to any chosen value.

13. In a fluid pressure brake equipment, in combination, a normally charged brake pipe, a normally charged auxiliary reservoir, a normally charged control reservoir, said reservoirs being normally connected together, a brake controlling valve device normally subject to the opposing pressures of the brake pipe and control reservoir and operative upon a reduction in brake pipe pressure to supply fluid under pressure from the auxiliary reservoir to effect an application of the brakes, said control valve device being operative upon a subsequent increase in brake pipe pressure to release fluid under pressure to effect the release of the brakes, valve means operative to control the connection between said reservoirs so as to isolate the control reservoir from the auxiliary reservoir when an application of the brakes is being effected and to again connect the reservoirs together when the brakes are being released, a communication between the control and auxiliary reservoir through which fluid under pressure may flow from the control reservoir to the auxiliary reservoir, and means operative when the pressure in said reservoirs is higher than normal for maintaining said communication open, and operative when the control reservoir reduces with auxiliary reservoir pressure to a predetermined value, in effecting an application of the brakes, to close said communication, and means operative to condition the last mentioned means for operation to close said communication in response to a reduction in reservoir pressure to any chosen value and being also operative to vent fluid under pressure from both of said reservoirs to the atmosphere.

FERNAND CHRISTEN.